US012770240B2

(12) United States Patent
Turnquist et al.

(10) Patent No.: US 12,770,240 B2
(45) Date of Patent: Oct. 20, 2026

(54) PRODUCT INSPECTION SYSTEM AND METHOD

(71) Applicant: Boon Logic Inc., Minneapolis, MN (US)

(72) Inventors: Brian Turnquist, Arden Hills, MN (US); Iesha Latty, Golden Valley, MN (US); Elise Courtemanche, Minneapolis, MN (US); Rodney Dockter, Plymouth, MN (US)

(73) Assignee: Boon Logic Inc., Minneapolis, MN (US)

( * ) Notice: Subject to any disclaimer, the term of this patent is extended or adjusted under 35 U.S.C. 154(b) by 434 days.

(21) Appl. No.: 17/787,757

(22) PCT Filed: Dec. 22, 2020

(86) PCT No.: PCT/US2020/066607
§ 371 (c)(1),
(2) Date: Jun. 21, 2022

(87) PCT Pub. No.: WO2021/133801
PCT Pub. Date: Jul. 1, 2021

(65) Prior Publication Data

US 2022/0414861 A1 Dec. 29, 2022

Related U.S. Application Data

(60) Provisional application No. 62/953,036, filed on Dec. 23, 2019.

(51) Int. Cl.
*G06T 7/00* (2017.01)

(52) U.S. Cl.
CPC .. *G06T 7/0004* (2013.01); *G06T 2207/20021* (2013.01); *G06T 2207/30108* (2013.01); *G06T 2207/30164* (2013.01)

(58) Field of Classification Search
None
See application file for complete search history.

(56) References Cited

U.S. PATENT DOCUMENTS

| | | | | |
|---|---|---|---|---|
| 5,204,911 A | | 4/1993 | Schwartz et al. | |
| 5,926,268 A | * | 7/1999 | Bonewitz | G01N 21/9036 356/240.1 |

(Continued)

FOREIGN PATENT DOCUMENTS

| | | | | |
|---|---|---|---|---|
| CN | 107622277 A | | 1/2018 |
| JP | 2005274157 A | * | 10/2005 |

(Continued)

OTHER PUBLICATIONS

Ben-Hur et al., "Support vector clustering." Journal of machine learning research 2, No. Dec. 2001: 125-137. (Year: 2001).*

(Continued)

*Primary Examiner* — Chan S Park
(74) *Attorney, Agent, or Firm* — Padda Law Group

(57) ABSTRACT

The present application discloses a product inspection system or method having application for detecting defective product. In illustrated embodiments the system utilizes an input product image to detect defects in product. As disclosed, a vector generator creates a gray scale data vector representing a number of pixels having an associated gray scale value for the product image. A defect detector uses the gray scale data vector and a data store of gray scale vector clusters having an associated anomaly index to assign an anomaly value to the product image, which is used to provide an inspection output for the product image.

20 Claims, 11 Drawing Sheets

(56) References Cited

U.S. PATENT DOCUMENTS

| | | | | |
|---|---|---|---|---|
| 6,448,549 | B1 * | 9/2002 | Safaee-Rad | G01N 21/9054 250/223 B |
| 6,606,402 | B2 * | 8/2003 | Wagman | G06T 7/001 382/172 |
| 6,889,164 | B2 * | 5/2005 | Okuda | G01R 31/3008 702/183 |
| 7,116,816 | B2 * | 10/2006 | Tanaka | H01J 37/28 382/172 |
| 7,229,845 | B1 * | 6/2007 | Luu | G06Q 50/04 257/E21.525 |
| 7,643,668 | B2 * | 1/2010 | Nakatani | G06T 7/001 382/172 |
| 7,773,801 | B2 * | 8/2010 | Kanda | G06F 18/40 382/224 |
| 8,103,087 | B2 * | 1/2012 | Maeda | G06T 7/001 356/237.1 |
| 8,700,498 | B2 * | 4/2014 | Hayashi | G06V 10/426 705/28 |
| 8,824,773 | B2 * | 9/2014 | Minekawa | G01N 23/22 382/141 |
| 8,983,168 | B2 * | 3/2015 | Chen | G07D 7/2016 382/135 |
| 9,569,836 | B2 * | 2/2017 | Hirai | G01N 23/2254 |
| 9,715,723 | B2 * | 7/2017 | Shlain | G06V 10/764 |
| 10,115,189 | B2 * | 10/2018 | Kasahara | G06F 18/22 |
| 10,157,456 | B2 * | 12/2018 | Higo | G06T 7/0004 |
| 10,297,021 | B2 * | 5/2019 | Minekawa | G06T 7/001 |
| 10,529,068 | B2 * | 1/2020 | Sakai | G06T 7/001 |
| 10,818,004 | B2 * | 10/2020 | Iwanaga | G06T 7/66 |
| 10,872,407 | B2 * | 12/2020 | Xi | G06T 7/60 |
| 10,891,508 | B2 * | 1/2021 | Fujimori | G01N 21/89 |
| 11,131,650 | B2 * | 9/2021 | Abolmaesumi | A61B 8/085 |
| 11,222,267 | B2 * | 1/2022 | Nagato | G06N 20/10 |
| 11,741,593 | B2 * | 8/2023 | Liu | G01N 21/8851 382/100 |
| 11,783,471 | B2 * | 10/2023 | Lin | G06V 10/764 382/157 |
| 11,953,447 | B2 * | 4/2024 | Mizumura | G06T 7/0008 |
| 11,977,033 | B2 * | 5/2024 | Sugasawa | G01N 21/8851 |
| 2001/0033683 | A1 * | 10/2001 | Tanaka | G06T 7/001 382/149 |
| 2002/0060584 | A1 * | 5/2002 | Okuda | G01R 31/3008 324/762.09 |
| 2002/0081025 | A1 * | 6/2002 | Wagman | G06T 1/0007 382/154 |
| 2007/0009152 | A1 * | 1/2007 | Kanda | G06F 16/5838 382/159 |
| 2007/0071308 | A1 * | 3/2007 | Nakatani | G03F 7/7065 382/149 |
| 2007/0177787 | A1 * | 8/2007 | Maeda | G06T 7/001 382/141 |
| 2008/0226156 | A1 * | 9/2008 | Ota | G06T 7/001 382/141 |
| 2008/0247630 | A1 * | 10/2008 | Horiuchi | G09G 3/006 382/141 |
| 2010/0310150 | A1 * | 12/2010 | Hayashi | G01N 21/9501 382/145 |
| 2012/0230591 | A1 * | 9/2012 | Shibata | H04N 1/4097 382/218 |
| 2013/0140457 | A1 * | 6/2013 | Minekawa | G01N 23/22 250/307 |
| 2013/0191058 | A1 * | 7/2013 | Wen | G01R 31/3008 702/64 |
| 2013/0279795 | A1 * | 10/2013 | Shlain | G06V 10/987 382/149 |
| 2015/0302568 | A1 * | 10/2015 | Hirai | G06T 7/001 382/149 |
| 2016/0267647 | A1 * | 9/2016 | Higo | G06T 7/0004 |
| 2017/0262974 | A1 * | 9/2017 | Kasahara | G06T 7/001 |
| 2017/0323435 | A1 * | 11/2017 | Minekawa | G06T 7/001 |
| 2018/0211373 | A1 * | 7/2018 | Stoppa | G06T 7/55 |
| 2019/0095742 | A1 * | 3/2019 | Fujimori | G06T 7/50 |
| 2019/0220972 | A1 * | 7/2019 | Iwanaga | G06T 7/0004 |
| 2021/0166374 | A1 * | 6/2021 | Banno | G06F 18/217 |
| 2021/0201089 | A1 * | 7/2021 | Lin | G06V 10/764 |
| 2021/0208107 | A1 * | 7/2021 | Abolmaesumi | A61B 8/5207 |
| 2021/0233232 | A1 * | 7/2021 | Sugasawa | G01N 21/8851 |
| 2022/0156914 | A1 * | 5/2022 | Ono | G01N 21/956 |
| 2022/0291136 | A1 * | 9/2022 | Mizumura | G01N 21/956 |
| 2022/0309640 | A1 * | 9/2022 | Liu | G01N 21/8851 |
| 2023/0196096 | A1 * | 6/2023 | Milne | G06N 3/047 706/25 |
| 2024/0005491 | A1 * | 1/2024 | Nefian | G06T 5/20 |

FOREIGN PATENT DOCUMENTS

| | | | | |
|---|---|---|---|---|
| WO | 9746329 A1 | | 12/1997 | |
| WO | WO-2005043141 A1 | * | 5/2005 | G01N 21/89 |
| WO | WO-2021000524 A1 | * | 1/2021 | G06T 7/0008 |

OTHER PUBLICATIONS

Wikipedia, k-means clustering, published on Dec. 19, 2019 (Year: 2019).*

Hsu et al., "A comparison of methods for multiclass support vector machines." IEEE transactions on Neural Networks 13, No. 2 (2002): 415-425. (Year: 2002).*

Bray et al., "A Neural Network based Technique for Automatic Classification of Road Cracks," The 2006 IEEE International Joint Conference on Neural Network Proceedings, Vancouver, BC, Canada, 2006, pp. 907-912, doi: 10.1109/IJCNN.2006.246782. (Year: 2006).*

JP-2005274157-A (machine translation) (Year: 2005).*

WO-2021000524-A1 (machine translation) (Year: 2021).*

Zhang et al., "Support vector machine-based nonlinear system modeling and control." Journal of Systems Engineering and Electronics 14, No. 3 (2003): 53-58. (Year: 2003).*

Khan et al., "A new intrusion detection system using support vector machines and hierarchical clustering." The VLDB journal 16 (2007): 507-521. (Year: 2007).*

Brereton et al., "Support vector machines for classification and regression." Analyst 135, No. 2 (2010): 230-267. (Year: 2010).*

Awad et al., "Support vector machines for classification." Efficient learning machines: Theories, concepts, and applications for engineers and system designers (2015): 39-66. (Year: 2015).*

Usama et al., "Unsupervised Machine Learning for Networking: Techniques, Applications and Research Challenges," in IEEE Access, vol. 7, pp. 65579-65615, 2019, doi: 10.1109/ACCESS.2019.2916648. (Year: 2019).*

Osuna et al., "An improved training algorithm for support vector machines." Neural Networks for Signal Processing. IEEE Xplore, 1997:276-285. (Year: 1997).*

Zhang, Zhongqiu et al. "An Automatic Recognition Method for PCB Visual Defects" 2018 International Conference on Sensing, Diagnostics, Prognostics, and Control (SDPC), IEEE, Aug. 15, 2018, pp. 138-142.

International Search Report and Written Opinion for priority PCT Application PCT/US2020/066607 mailed Mar. 18, 2021 (25 pages).

* cited by examiner

PRODUCT INSPECTION SYSTEM AND METHOD

CROSS-REFERENCE TO RELATED APPLICATIONS

The present application claims priority to U.S. Provisional Application Ser. No. 62/953,036 filed Dec. 23, 2019 and entitled PRODUCT INSPECTION SYSTEM AND METHOD, the content of which is hereby incorporated into the present application in its entirety.

BACKGROUND

Product inspection increases the cost and expense of manufacturing and distributing product. Defective product can result in loss of reputation as well as other quality control issues. Visual product inspection techniques can be cumbersome and expensive. Additionally, such techniques lack consistency and repeatability. The present application addresses these and other issues.

SUMMARY

The present application relates to a product inspection system or method. In illustrated embodiments, the inspection system includes one or more cameras to capture a product image including a plurality of gray scale pixels having an associated gray scale value. A vector generator creates a gray scale data vector for the product image including integer values representing a number of pixels having an associated gray scale value in the product image. The gray scale data vectors are matched to one or more gray scale vector clusters to provide an anomaly value for the product image. In illustrated embodiments the anomaly value is related to a statistical measure or probability that the gray scale clusters are associated with defective product. The anomaly values are used to provide an inspection output that the product is defective if the anomaly value is at or above a threshold value or based upon the anomaly value relative to the threshold value.

A method for inspecting product is disclosed including the steps of generating a gray scale data vector for an input product image and comparing the gray scale data vector with gray scale vector clusters to match the gray scale data vector to gray scale vector clusters having similar attributes to provide anomaly value for the gray scale data vector. The anomaly value is compared to a threshold value to reject product if the anomaly value is at or above a threshold value or based upon a comparison of the anomaly value to the threshold value.

As disclosed, the present application relates to an inspection application comprising instructions stored on a data storage device and implemented through one or more hardware devices or circuitry adapted to generate gray scale data vectors and match the gray scale vectors to gray scale clusters to provide an anomaly value based upon the associated gray scale clusters. The application uses the anomaly value to provide an inspection output to reject product if the anomaly value is above a threshold value or reject product based upon the anomaly value relative to the threshold value. The present application includes other features, combinations and attributes as described and illustrated in the following description of illustrative embodiments.

DETAILED DESCRIPTION OF ILLUSTRATIVE EMBODIMENTS

Figure 1A:
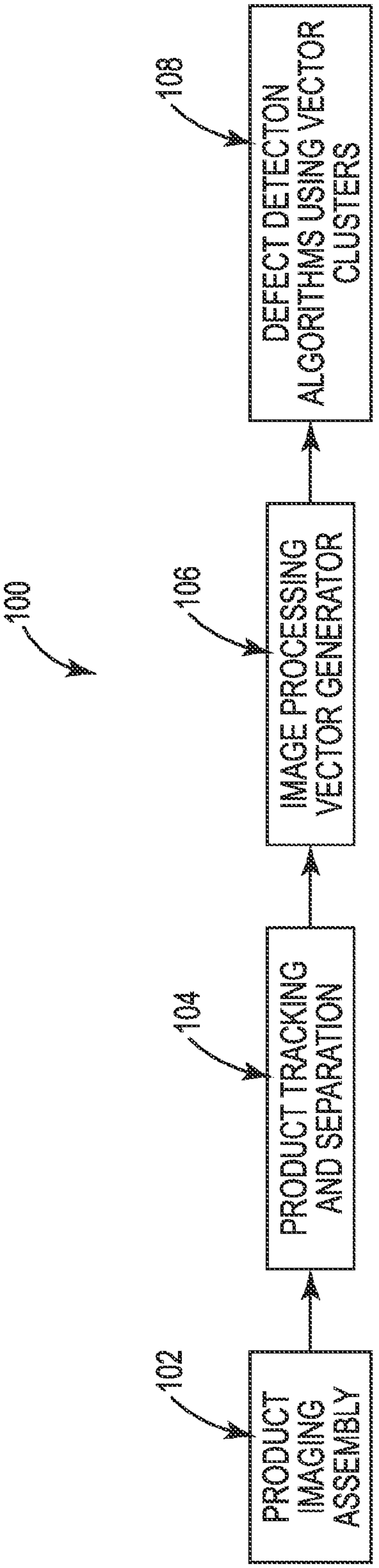
FIG. 1A is a diagrammatic illustration of a product inspection system of the present application.

The present application relates to a product inspection system 100 and method which has application for inspecting product along an assembly line for defects for quality control. As will be appreciated by those skilled in the art, the present application has application for inspecting bottles or other products for streamline manufacturing and process quality control. As shown in FIG. 1A, the product inspection system includes a product imaging assembly 102, product tracking and separation functions or algorithms 104, image processing and vector generator algorithms or functions 106 and defect detection algorithms or functions 108 configured to identify defective products using vector clusters.

Figure 1B:
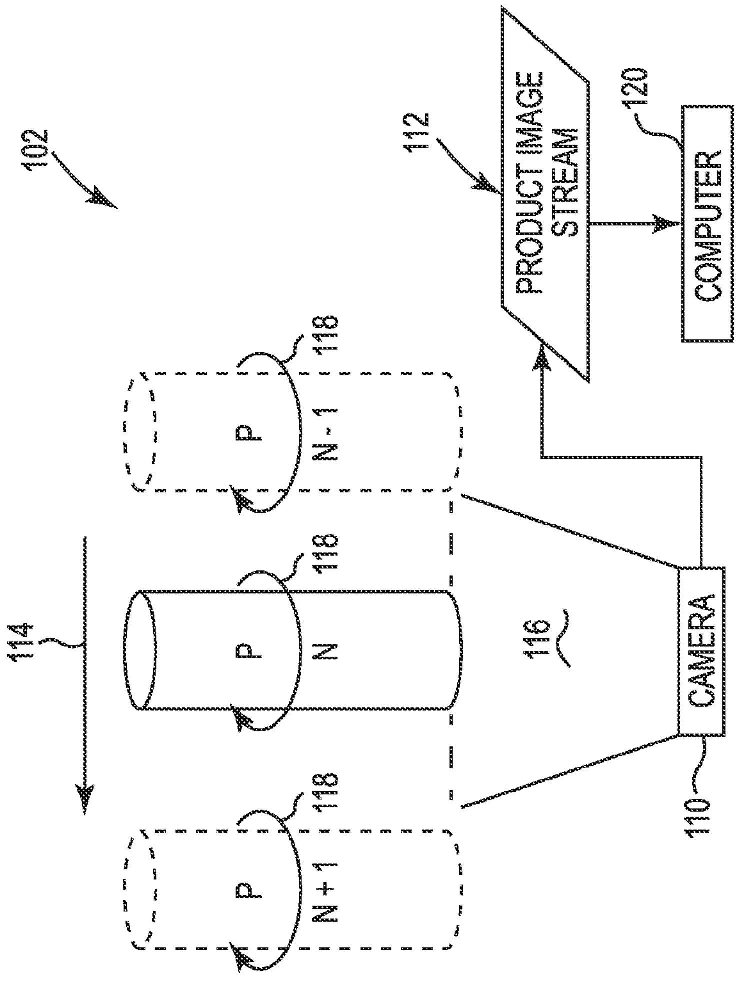
FIG. 1B illustrates a product imaging assembly for providing a digital image stream or video for product movable along a conveyor path for inspection.

In an illustrative embodiment, the product imaging assembly 102 includes at least one camera 110 to capture an input image or image stream 112 for products $P_{n+1}$, $P_n$, $P_{n-1}$ moveable along a conveyor or inspection path 114 past an imaging field 116 of the camera 110 as illustrated by the arrow in FIG. 1B. As product $P_{n+1}$, $P_n$, $P_{n-1}$ moves along path 114, the product is rotated as illustrated by arrows 118 to image a perimeter of the product $P_{n+1}$, $P_n$, $P_{n-1}$. As shown in FIG. 1B, the image stream or video file 112 is provided to a computer 120 for product tracking and image separation. Illustratively the computer 120 includes hardware, software, and various circuitry components to implement the algorithms and processing functions of the present application. Additionally, the computer 120 includes one or more input devices or ports, display devices, one or more processors and one or more data storage or memory devices (not shown) as will be appreciated by those skilled in the art.

Figure 1C:
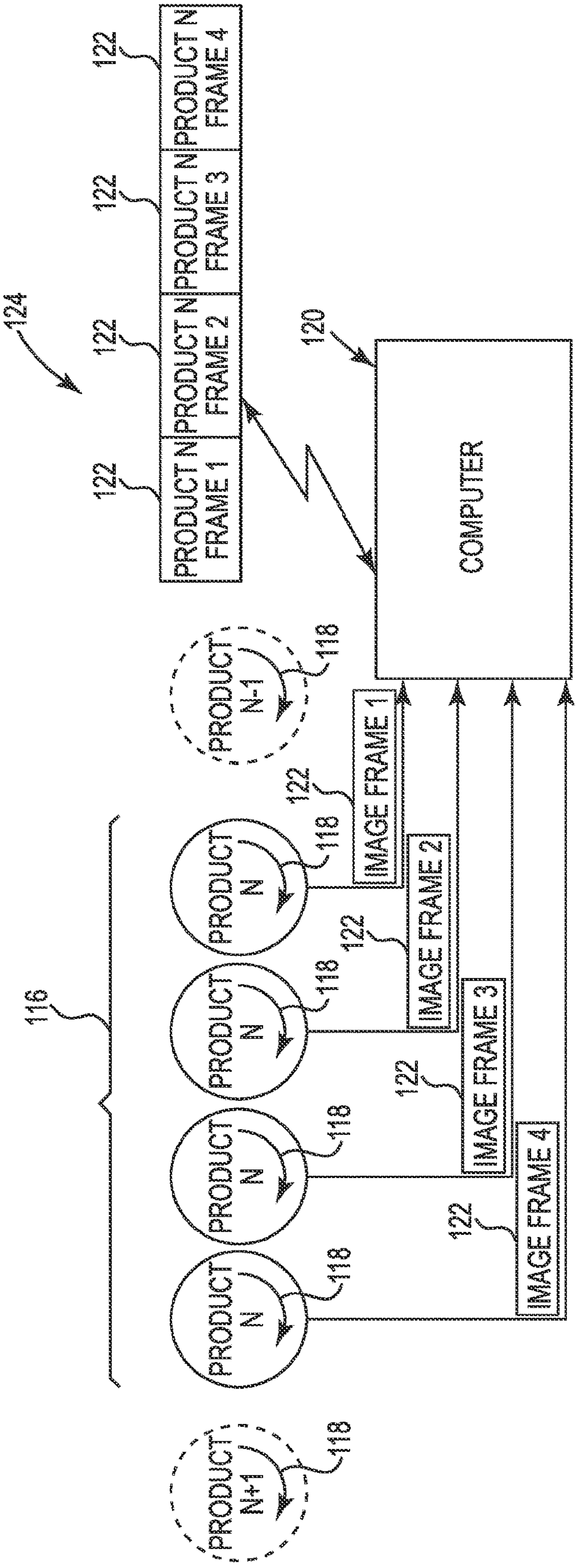
FIG. 1C is a schematic illustration of the imaging assembly capturing an input image stream including a plurality of image frames as product $P_n$ moves along the conveyor path.

The camera 110 includes a charged coupled device having an array of pixels to capture the product image or image stream 112 as products $P_{n+1}$, $P_n$, $P_{n-1}$. are conveyed past the camera 110. The speed $V_{x-y}$ of the product along the conveyor path 114 and rotational velocity $V_\theta$ of the product are set so that the product completes a full revolution within the imaging field 116 of the camera 110. As shown in FIG. 1C, the output image stream 112 includes a plurality of image frames 122 which aggregatively form a complete image file 124 of a perimeter of products $P_{n+1}$, $P_n$, $P_{n-1}$. In illustrative embodiments, the tracking and separation algorithms or functions 104 use tracking features to identify transitions between products $P_{n+1}$, $P_n$, $P_{n-1}$ to separate the image frames 122 for each product $P_{n+1}$, $P_n$, $P_{n-1}$. Illustrative tracking functions for example use time tracking features based upon one or more of conveyor speed $V_{x-y}$, camera speed, rotation speed $V_\theta$ of products $P_{n+1}$, $P_n$, $P_{n-1}$ and/or image features to detect spacing gaps between products $P_{n+1}$, $P_n$, $P_{n-1}$ to locate leading edges of products to compile the image frames or files 124 for each product $P_{n+1}$, $P_n$, $P_{n-1}$. In an illustrative embodiment, the camera speed is designed to provide 40 image frames 122 as product $P_{n+1}$, $P_n$, $P_{n-1}$ passes through the imaging field 116 of the camera 110.

Figure 1D:
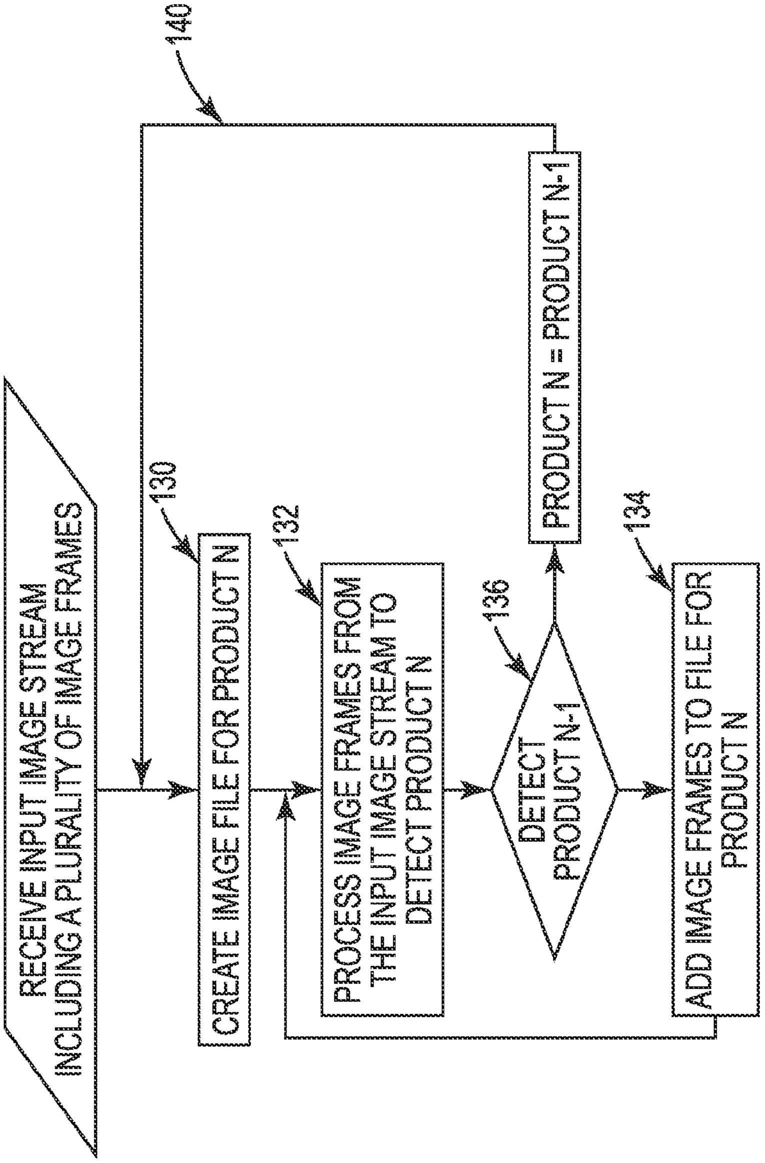
FIG. 1D illustrates an embodiment of the product tracking and separation functions or algorithms of the present application.

FIG. 1D illustrates process steps of an embodiment for compiling the composite product image file 124 for products $P_{n+1}$, $P_n$, $P_{n-1}$ from multiple image frames 122 for an input image stream. As shown in step 130, the product image file 124 is created for the product image frames for product $P_n$, and in step 132 the image frames 122 are processed from the image stream 112 to detect product $P_n$. The image frames 122 for product, $P_n$, are added to the file 124 for product $P_n$, in step 134. Steps 132-134 are repeated until product $P_{n-1}$ is detected in step 136. Upon detection of product, $P_{n+1}$, step 130 is repeated to create a new product file for product $P_{n-1}$ as illustrated by feedback line 140. Steps 132-134 are repeated for each product $P_{n+1}$, $P_n$, $P_{n-1}$ that moves past the camera imaging field 116 along the conveyor path 114 to create image files 124 including multiple image frames 122 of a perimeter of each product $P_{n+1}$, $P_n$, $P_{n-1}$.

Figure 2A:
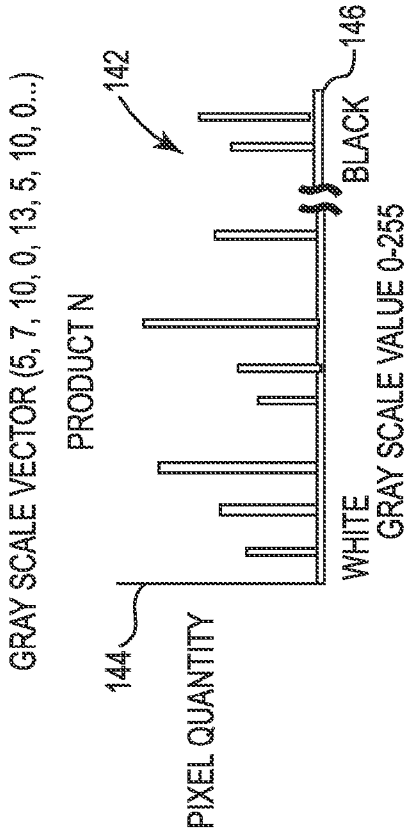
FIG. 2A is a graphical illustration of a gray scale vector for a product image for products $P_{n+1}$, $P_n$, or $P_{n-1}$.

As previously described in FIG. 1A, the application includes vectorization or vector generator algorithms 106 to provide gray scale vector representations of the product image frames 122 for products $P_{n+1}$, $P_n$, $P_{n-1}$. Gray scale vectors are generated using a gray scale value for pixels of the image frames 122. Pixels having a white or lighter tone are assigned a lower gray scale value and darker pixels of the image are assigned a higher gray scale value. In the illustrated embodiment, the gray scale values range between 0-255 where zero represent a white gray scale and 255 is a black gray scale. As shown in FIG. 2A, the gray scale vector associates the number of pixels for each gray scale value in the image or image frame 122 as a histogram of magnitudes 142 as graphically shown where a quantity (n) 144 is shown for each gray scale value 146. The gray scale vector created is an integer data array having a plurality of integer elements for each gray scale value or group of gray scale values.

Figure 2B:
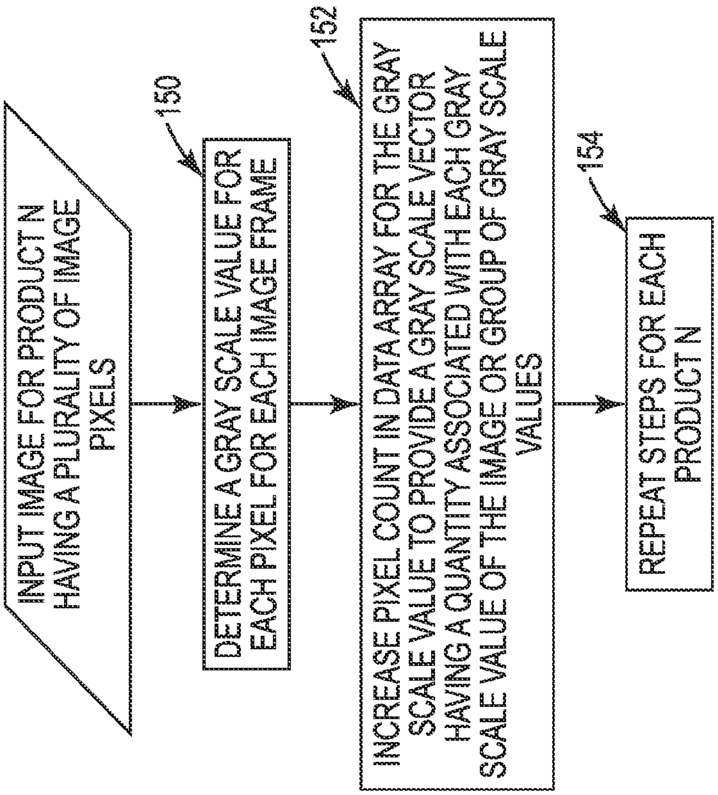
FIG. 2B illustrates an embodiment of a vector generator algorithm or function for creating gray scale vectors for product images for products $P_{n+1}$, $P_n$, $P_{n-1}$ movable along the conveyor path.

FIG. 2B illustrates a flow chart of steps of an illustrative embodiment of the vector generator algorithms or functions 106. As shown, in step 150, the grey scale value for pixels of each image frame 122 are determined and as illustrated by step 152 the number of pixels for each gray scale value is stored in the vector data array. The steps 150-152 are repeated as illustrated by step 154 to provide gray scale vectors for each product $P_{n+1}$, $P_n$, $P_{n-1}$ movable along the conveyor path 114.

Figure 3A:
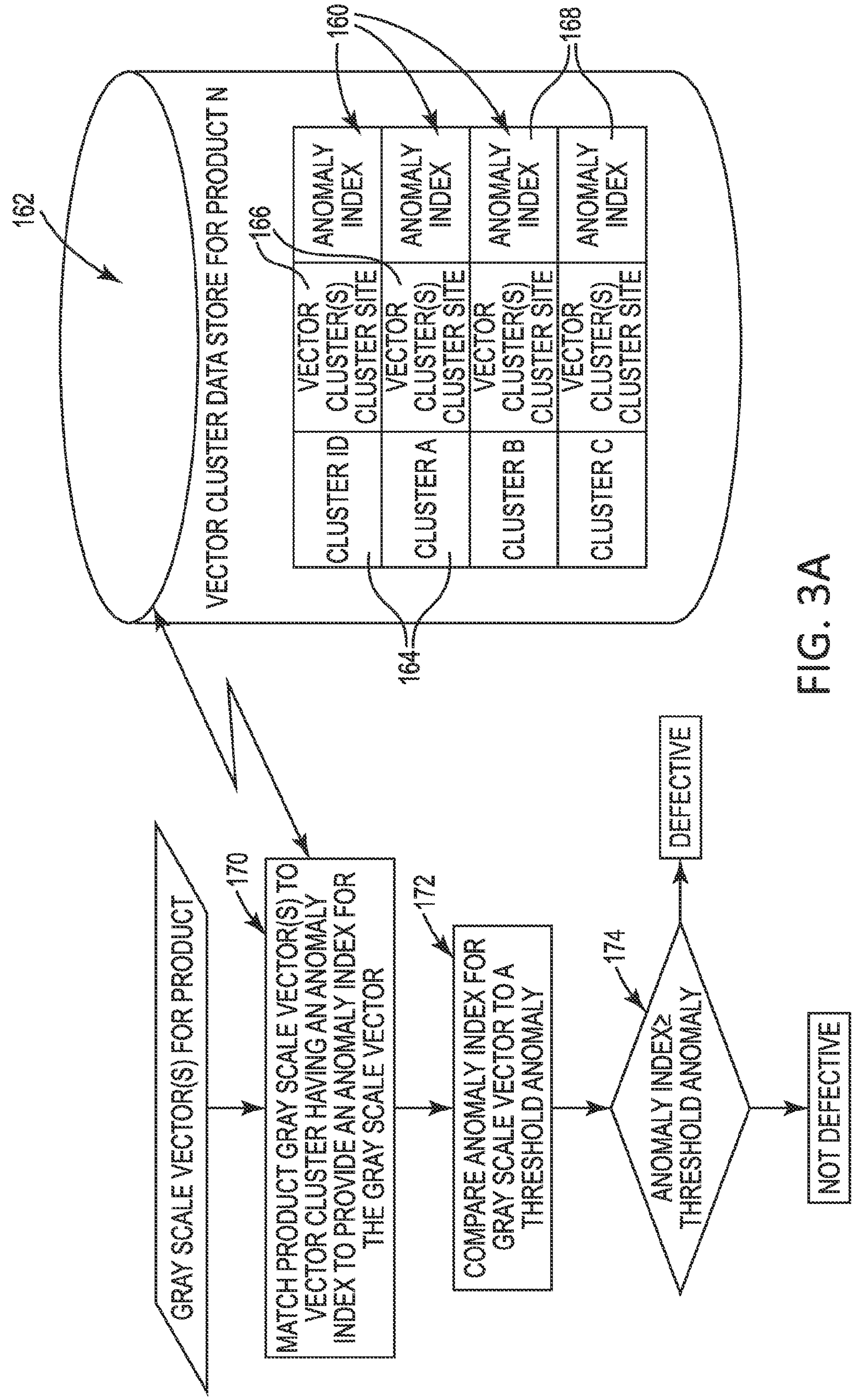
FIG. 3A schematically illustrates use of gray scale clusters for detecting product defects.

The defect detection algorithms or functions 108 use the product gray scale vectors to detect product defects and anomalies. The defect detection algorithms 108 include matching or segmentation functions to match the product gray scale vectors for product $P_n$, to similar vector clusters 160 in a vector cluster data store 162. The gray scale vector clusters 160 include a cluster identification 164, gray scale vector(s) 166 and an associated anomaly index 168 as shown in FIG. 3A. As shown in step 170, product gray scale vectors are matched to the vector clusters 160 based upon similarity of the product vectors to the cluster vectors 160.

The anomaly index 168 of the matched cluster 160 is associated with the product image to provide an anomaly value and in step 172 the anomaly value is compared to a threshold anomaly value. As shown in decision step 174 of the illustrative embodiment if the anomaly value is greater than or equal to the threshold anomaly, the product is defective and if the anomaly value is less than the threshold anomaly value then the product is not defective. Clusters 160 having a high anomaly index 168 have a higher defect probability and are more likely to be associated with defective product. Clusters 160 with a lower anomaly index 168 have a lower defect probability and are less likely to be associated with defective product. Product gray scale vectors which do not match any of the clusters 160 in the datastore 162 are assigned a maximum anomaly value and are rejected as defective. Thus as described, the defect detection algorithms and functions provide a defect detector for product movable along a conveyor path where product is defective if the anomaly value is above a threshold anomaly value or in an alternate embodiment, where the anomaly value is below a threshold value.

Figure 3B:
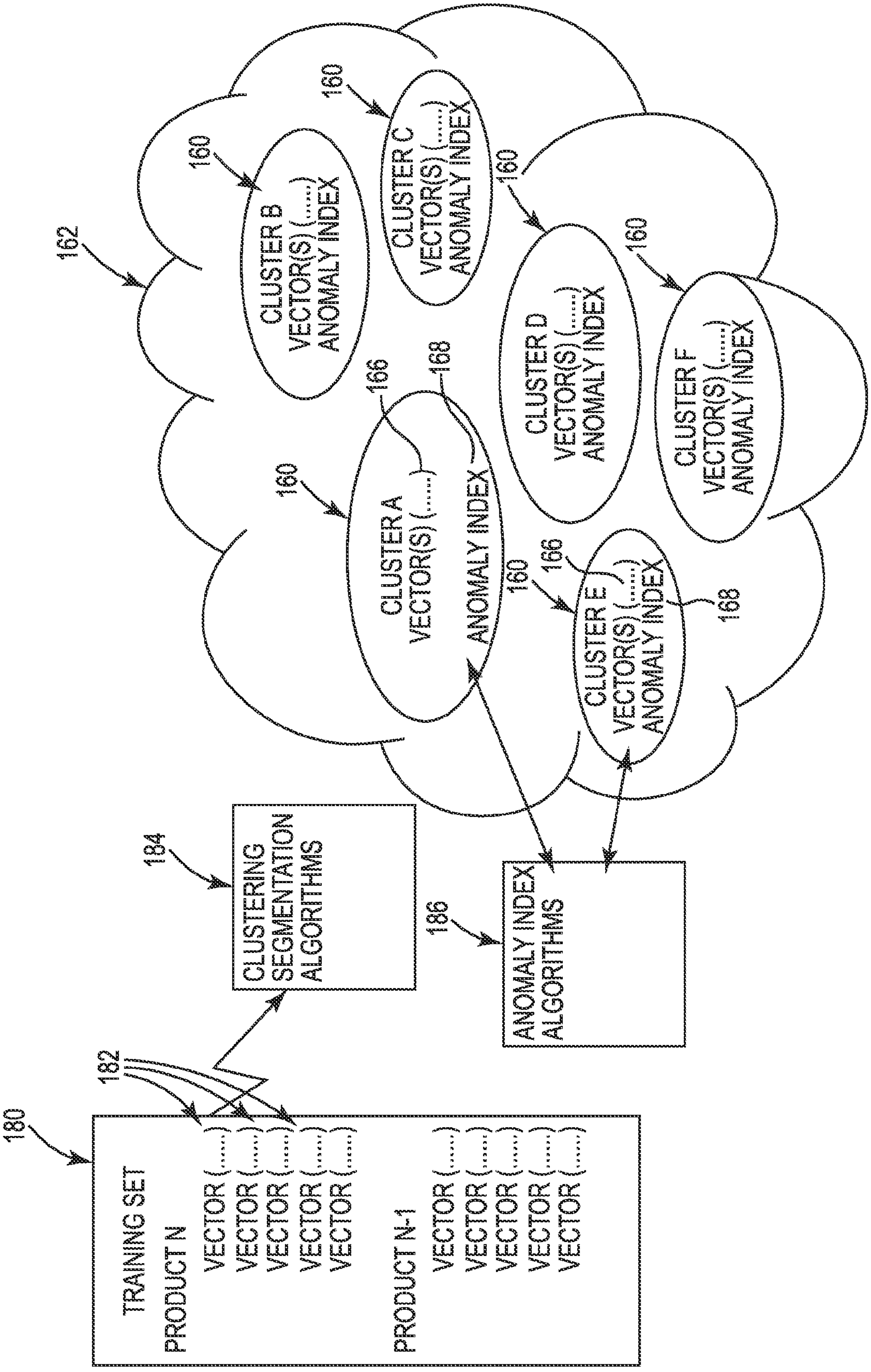
FIG. 3B schematically illustrates use of clustering or segmentation algorithms or functions for creating gray scale vector clusters for real time detection of product defects along a conveyor path or line.

The gray scale vector clusters 160 of data store 162 are created using unsupervised machine learning. In an illustrated embodiment, the clusters 160 are created using a product training set 180 including gray scale vectors 182 for a plurality of training products $P_n$, $P_{n-1}$. The gray scale vectors for the training products are created via the imaging process steps as previously described in FIGS. 1B-1D and vector generator algorithms or functions 106 illustrated in FIGS. 2A-2B. As shown in FIG. 3B, the gray scale vectors 182 are clustered using cluster or segmentation algorithms 184 to group vectors having similar attributes into similar clusters 160. Illustratively, the algorithms use K-means, principle component analysis or other clustering techniques to group vectors into clusters 160 having the same or similar gray scale patterns. Another clustering or segmentation algorithm that may be used is random forests. The clustering or segmentation functions 184 of the present application are not limited to a particular clustering algorithm and other machine learning or unsupervised training algorithms or technology such as Boon Nano available from Boon Logic of Minneapolis, MN can be used to cluster gray scale vectors of product images. In an illustrated embodiment, training set 180 includes defect free products and the clusters 160 provide models of defect-free product. In an alternate embodiment, the clusters 160 are created using a random training set including defective and defect free products to build a comprehensive model of normal variations found in defect-free products as well as defective variants. The size of the training set 180 is selected so that new cluster growth levels off indicating the learning process is complete.

As shown clusters 160 are assigned the anomaly index 168 through anomaly index algorithms 186. The anomaly index algorithms 186 use the size of the clusters 160 and deviation of the clusters from other clusters to calculate the anomaly index 168. Larger clusters are associated with more frequently occurring images within the normal variations for defect free product. Smaller clusters include less frequently occurring vectors outside the normal product variations and are more likely defective. In illustrated embodiments, the anomaly index 168 is calculated based upon a mathematical deviation of the cluster from other clusters in the training set 180. The anomaly index 168 is represented as a logarithmic function to provide differentiation between defect and defect free clusters for identifying defects in product along the conveyor path. The anomaly index ranges between 0-1.0. More common clusters are assigned a lower anomaly index as compared to less common clusters. Gray scale vectors for products $P_{n+1}$, $P_n$, $P_{n-}$ not found in the data store 162 are assigned a 1.0 or high anomaly value to indicate the product is defective. In alternate embodiments, clusters can be added to the data store 162 to provide additional machine learning or training.

Figure 3C:
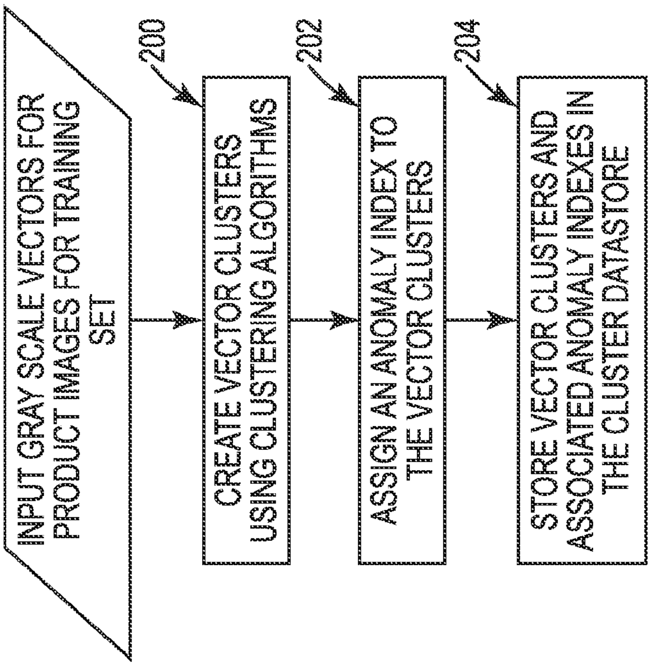
FIG. 3C is a flow chart illustrating clustering steps for creating vector clusters for gray scale vectors for product images.

FIG. 3C is a flow chart illustrating process steps of creating vector clusters for use for defect detection for quality control. As shown in step 200 the algorithms include instructions to cluster gray scale vectors into vector clusters 160 to group similar gray scale vectors in the same cluster 160. In step 202, the anomaly index 168 is assigned to the vector cluster 160 and the vector clusters 160 and associated anomaly indexes 168 are stored in datastore 162 as shown in step 204. As described, the vector clusters 160 can be generated using a non-defective product set 180 to represent normal variations in the product. In another embodiment, the vector clusters are generated using a set of defective and defect free product to provide a comprehensive cluster set for defect detection.

Figure 4B:
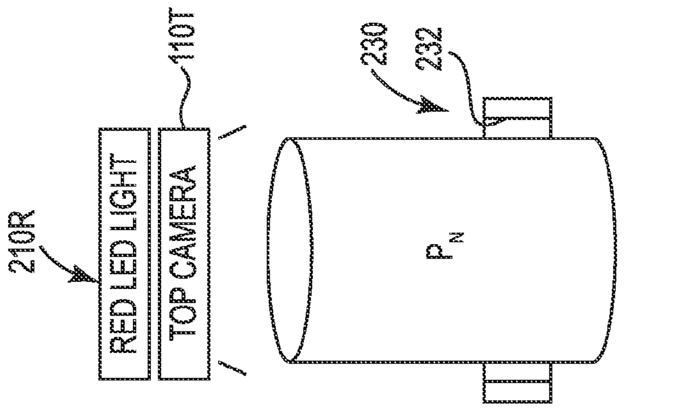
FIG. 4B diagrammatically illustrates a front view of product $P_n$ movable along the conveyor path of FIG. 4A.
Figure 4A:
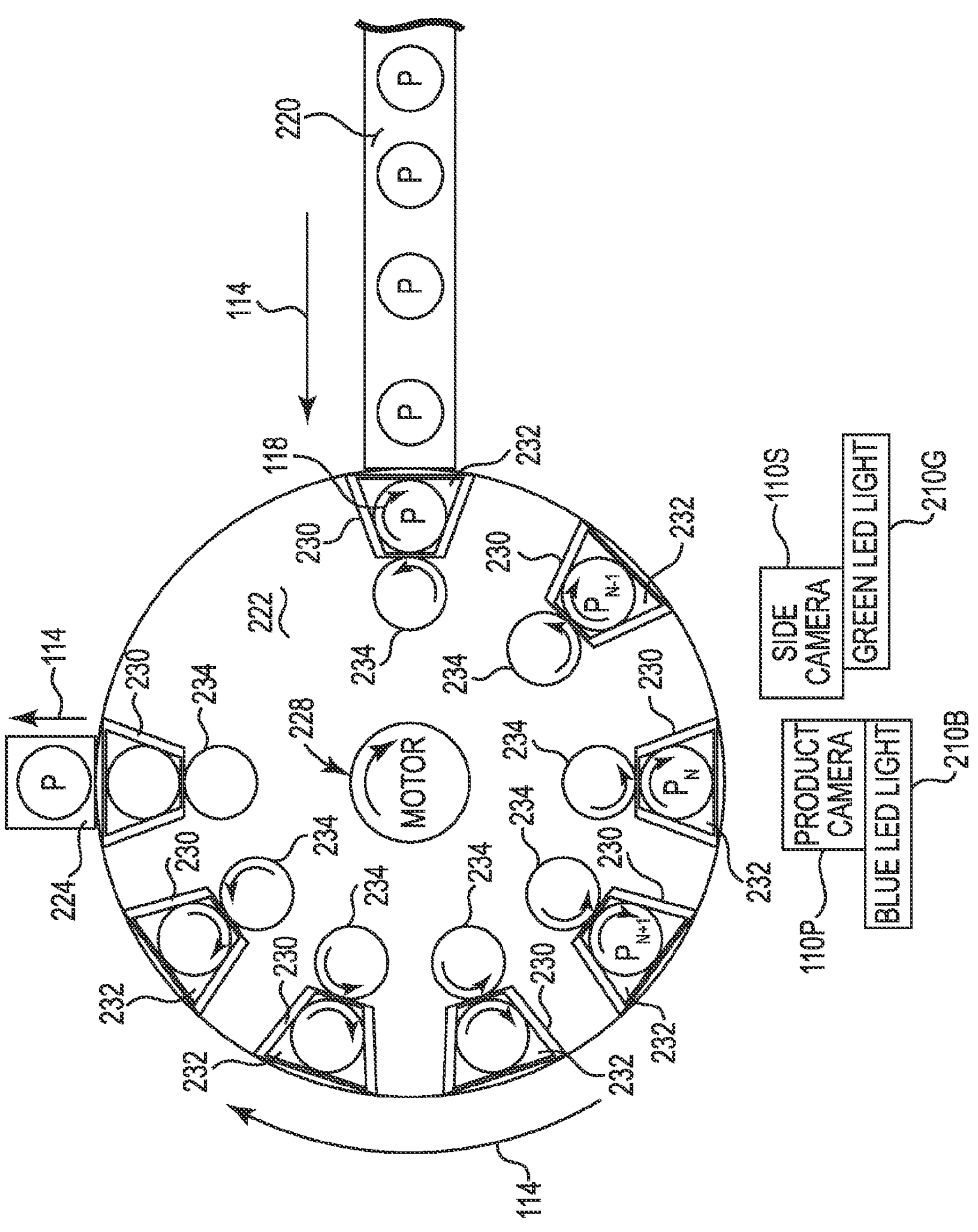
FIG. 4A diagrammatically illustrates a top view of an inspection station having product $P_n$ movable along the conveyor path for imaging.

FIGS. 4A-4B illustrates an embodiment of the imaging assembly 102 of the present application including multiple cameras along the conveyor path 114 for multiple imaging views. As shown, the imaging assembly 102 includes a product camera 110P, a side camera 110S and a top camera 110T as shown in FIG. 4B. The product and side cameras 110P, 110S capture a perimeter image of the product and the top camera 110T captures an image of a top portion of the product as product is conveyed along the conveyor path 114 as previously described. In illustrative embodiments the cameras include a collimated filter to provide a high-contrast image to the camera. In the illustrated embodiment, the assembly includes different colored lights 210 having different frequencies to provide backlight for the cameras 110. Input images for cameras are filtered to block backlight from other cameras 110 to limit interference between camera images. Digital and physical filters can be used to filter backlight from other cameras. Mirrors and other background lighting can be used depending upon the particular application and desired imaging.

In an illustrated embodiment where the product is a clear or transparent bottle, a blue LED light 210B is used for product camera 110P, a green LED light 210G is used for side camera 110S as shown in FIG. 4A and a red LED light 210R is used for top camera 110T as shown in FIG. 4B. Product camera 110P filters all but blue light frequencies, side camera 110S filters all light but green light frequencies and the top camera 110T filters all light except red light frequencies to capture the desired product image view. In an illustrated embodiment, the blue light for product camera 110C is selected to inspect content inside a transparent bottle product, the red light is selected for side camera S to detect surface defects on the sides or bottom of a bottle product and red light is selected to detect defects on a top cap of a bottle. While a particular color arrangement is shown, application is not limited to the particular arrangement shown.

In the embodiment shown in FIG. 4A, product from an infeed conveyor 220 is fed to a rotating platform 222 for product inspection and is discharged onto discharge conveyor 224. Illustrative infeed and discharge conveyors are belt or roller type conveyors operable through one or more motors through a controller or controller area network (CAN)(not shown). As shown, the rotating platform 222 is rotated via motor 228 through the controller or CAN. The rotating platform 222 includes a plurality of product holders 230 spaced about the rotating platform 222. The product holders 230 include a pocket 232 formed via spaced arms that grip product to convey product $P_{n+1}$, $P_n$, $P_{n-1}$ along the path 114 via rotation of platform 222. As shown a spacing gap on an outer side of the pockets 232 is wider for insertion and placement of product into holders 230. Rotation is imparted to product in the holders 230 through a plurality of rollers 234 rotationally supported relative to the platform 222 and rotated through a rotation drive mechanism (not shown) to rotate product as previously illustrated by arrow 118 as product $P_{n+1}$, $P_n$, $P_{n-1}$ passes through the imaging field 116 of cameras 110P, 110S, 110T as previously described.

Figure 4C:
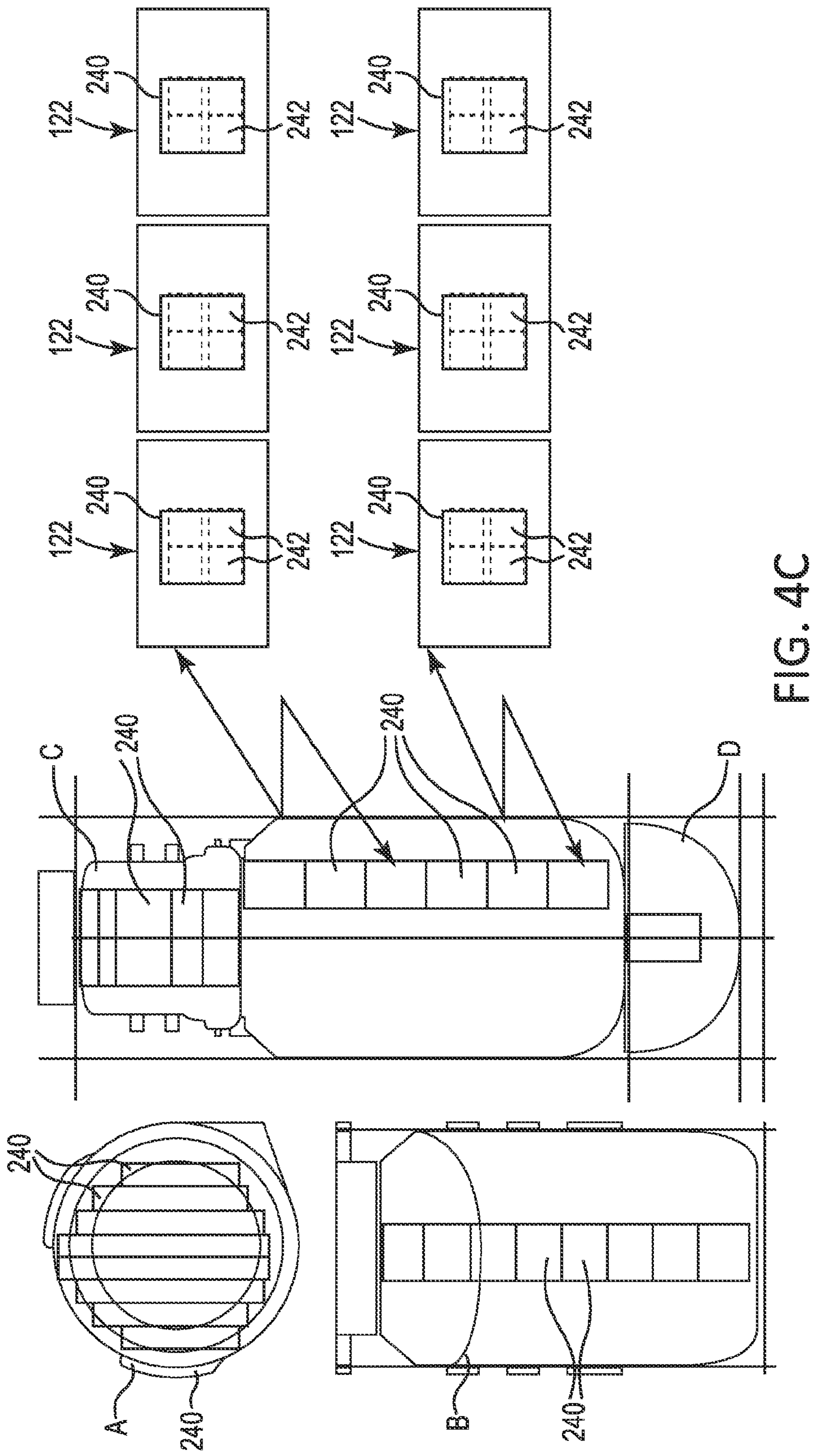
FIG. 4C illustrates division of product image frames into cells and cell blocks for embodiments of the present application.

As previously described, cameras HOP, 110S, HOT are positioned relative to the platform 222 to provide input images for different views or perspectives of the product as shown FIG. 4C. As shown in FIG. 4C, image A is from top camera 110T, image B is from product camera 110P, image C is from side camera 110S and product camera HOP and image D is of a bottom of product $P_n$ which is captured by top camera 110T through a mirror or additional camera (not shown), In an illustrated embodiment, the imaging processing algorithms 106 divide the image frames into cells or windows 240 which are compiled to provide the perimeter image of products $P_{n+1}$, $P_n$, $P_{n-1}$ from the plurality of image frames 122. The cells or windows 240 are further subdivided into blocks 242 for the purpose of implementing the vector generator algorithms 106 and defect detection algorithms 108 previously described. The number and size of the cells 240 and cell blocks 242 for the product image frames 122 are determined based on one or more of the rotation speed of the platform 222, camera speed or number of frames 122 in the imaging field 116, product spacing as well as the rotation speed $V_\theta$ and size of the product. In an illustrative embodiment, the cells 240 are sized relative to the rotational speed of the product so that the compilation of the cells 240 for the image frames 122 for each product provides a complete perimeter image of the product. The quantity and cell dimensions are customized depending upon the product type and operating parameters as disclosed. The cell dimensions and features can be calculated based upon rotation and imaging speed to optimize operation and limit duplicate portions in the image frames 122.

The image processing functions locate the cells 240 and cell blocks 242 in the image frames 122. The processing or vector generator algorithms 106 of the application use the gray scale values for the pixels in each cell block 242 for each image frame 122 to create the gray scale vectors for each cell 240. The plurality of gray scale vectors for each block 242 are matched with clusters 160 as previously described to provide the associated anomaly value for each of the cell blocks 242. The anomaly value for cell blocks 242 are combined through a summation process to provide an output anomaly value 168 for each cell 240 for the purpose of defect detection. If an anomaly value 168 for any of the cells 240 is above the threshold anomaly value the product is rejected. The anomaly values 168 for cells 240 for all product frames 122 and all cameras can be aggregated and compared to the threshold anomaly value 168 for accepting or rejecting product. The drawing of FIG. 4C is for illustration and as will be appreciated cells 240 can have any number of blocks 242 depending upon the pixel count of the image and other operating parameters.

Figure 4D:
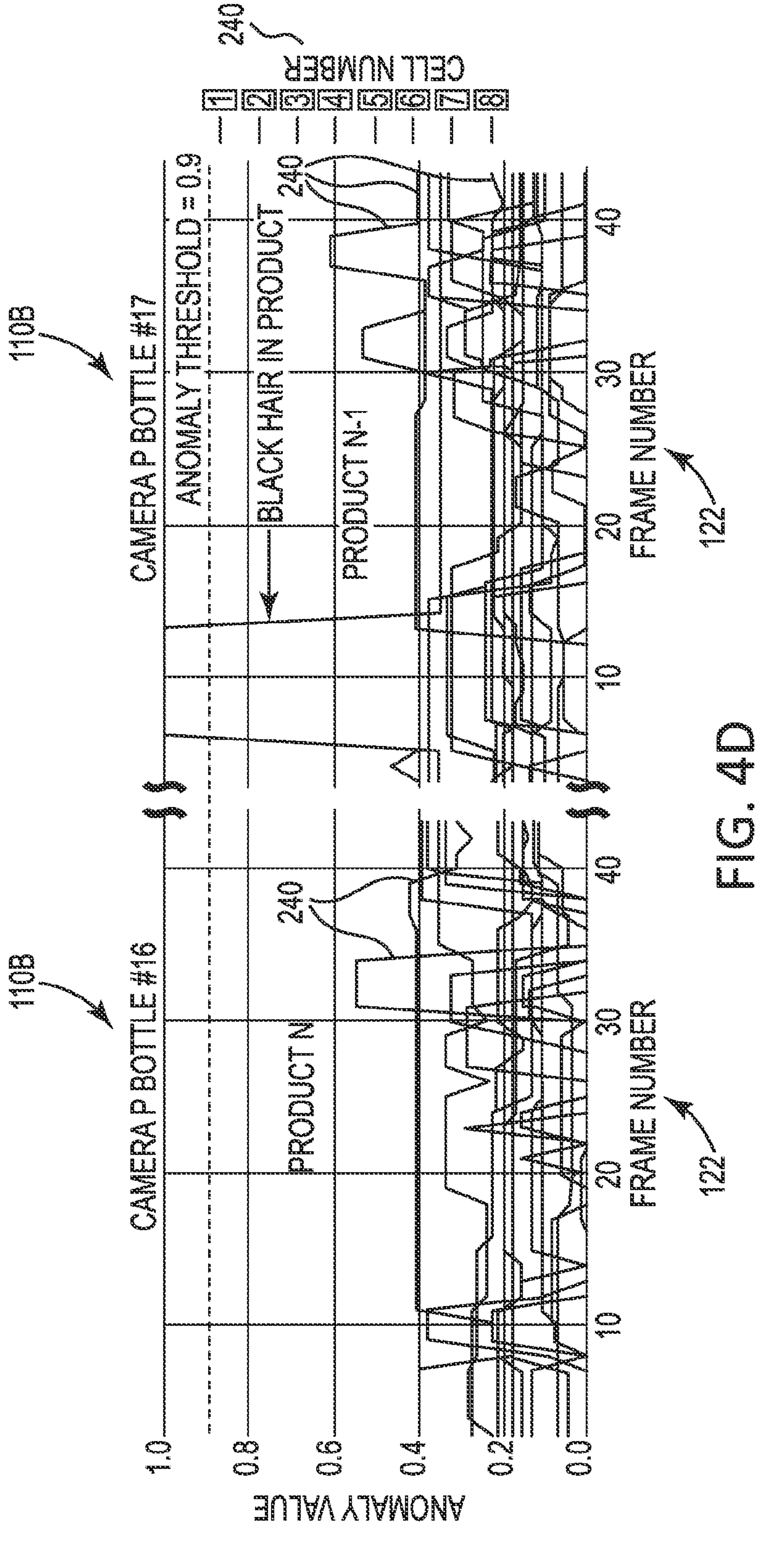
FIG. 4D illustrates anomaly value graphs for products $P_n$, $P_{n-1}$ for a plurality cells from a plurality of image frames.

FIG. 4D illustrates a graph of anomaly values for bottles or product $P_{n+1}$, $P_n$, $P_{n-1}$. As shown, the graph includes anomaly values for multiple frames 122 of cells 240 from the product camera 110P for products $P_n$, $P_{n-1}$. The anomaly values as described are compared to the anomaly threshold to detect defects. As shown, the anomaly value for product $P_{n-1}$ for a cell of an image frame 122 exceeds the threshold due to a back hair in product and thus based upon the anomaly value would be rejected as defective. The image streams 112 from cameras can be used to create clusters as previously described with respect to FIGS. 3B-3C using gray scale vectors for cells 240 or cell blocks 242 from multiple frames 122 of a training set 180 and clustering or segmentation algorithms 184 as previously described.

While illustrative embodiments are shown, application of the present invention is not limited to the illustrated embodiments and changes and modification can be made as will be appreciated by those skilled in the art. In illustrative embodiments, the image frames can be used to provide a visual inspection of the product using a color assignment scheme for different gray scale values to locate anomalies in the image frames for products. In an illustrative embodiment, the rotation speed of the platform is set to image 30 bottles per minutes to provide real time product inspection on a conveyor line.

What is claimed is:

1. A product inspection system for detecting defects in a product comprising:

one or more cameras to capture a product image stream of a first product comprising a plurality of product image frames;

a computer device operably connected to the one or more cameras to receive the plurality of product image frames, the computer device comprising a processor, a data storage device, and image processing instructions executable on the processor, wherein the image processing instructions are configured to generate at least one gray scale vector of the first product based on the product image frames, wherein each of the at least one gray scale vector includes integer values representing a number of pixels having an associated gray scale value in the captured product image from the one or more cameras of the first product;

at least one gray scale vector cluster for a non-defective product, wherein the at least one gray scale vector cluster is stored on the data storage device, wherein each of the at least one gray scale vector cluster comprises an anomaly index; and defect detector instructions executable on the processor and configured to detect product defects in the first product and wherein the defect detector instructions to detect product defects, further comprises instructions configured to match the at least one gray scale vector for the first product to the at least one gray scale vector clusters for a non-defective product, wherein the defect detector instructions further comprise instructions configured to assign an anomaly value to the at least one gray scale vector based on the matching of the at least one gray scale vector for the first product to the at least one gray scale vector cluster for the non-defective product, and wherein the defect detector instructions further comprise instructions configured to provide an inspection output indicating whether the first product is defective based on comparing the anomaly value to a threshold value.

2. The inspection system of claim 1 wherein the one or more cameras capture an image stream including a plurality of product image frames and the vector generator creates a plurality of gray scale data vectors for the product image frames and the defect detector matches the plurality of gray scale data vectors to the gray scale vector clusters and assigns the anomaly values to the plurality of product image frames and uses the anomaly values from the product image frames to provide the inspection output.

3. The inspection system of claim 2 wherein the plurality of product image frames correspond to a plurality of products movable along a conveyor path and the system includes product tracking and separation functions to separate image frames into product files for each of the plurality of products.

4. The inspection system of claim 2 wherein the inspection system includes a conveyor assembly to move the product along a conveyor path and the conveyor assembly includes at least one product holder having a rotation mechanism to rotate the product and the one or more cameras are supported along the conveyor assembly to capture the image stream including the plurality of product image frames of a circumference of the product as the product rotates in the product holder.

5. The inspection system of claim 4 wherein the inspection system includes a plurality of product holders coupled to a rotating platform and the one or more cameras are supported relative to the rotating platform to capture the product image stream for the product on the rotating platform.

6. The inspection system of claim 1 wherein the gray scale value of the gray scale pixels is a gray scale range between 0-255 where 0 represents a white gray scale value and 255 represents a black gray scale value.

7. The inspection assembly of claim 1 wherein the data store of gray scale vector clusters is created using a training set of product images and clustering algorithms to cluster gray scale data vectors for the training set of product images with similar attributes and the anomaly index for the gray scale vector clusters is assigned using deviation measures of the gray scale vector clusters relative to other gray scale vector clusters.

8. The inspection system of claim 7 wherein the training set of product images includes product images for at least one of a set of defective product and a set of non-defective product.

9. The inspection system of claim 7 wherein the gray scale data vectors of the training set of product images are clustered using K-means clustering techniques.

10. The inspection system of claim 1 wherein the product image includes a plurality of image cells and the vector generator creates a plurality of gray scale data vectors for the gray scale pixels in each of the image cells and the defect detector matches each of the plurality of gray scale data vectors with the one or more gray scale vector clusters in the data store.

11. The inspection system of claim 1 wherein the one or more cameras provide a product image stream including a plurality of product image frames for a plurality of products movable along a conveyor path and the system includes product tracking and separation features to separate product image frames for sequential product to compile a product image file including a plurality of product image frames associated with each of the plurality of products.

12. A method comprising the steps of:

capturing, by one or more cameras, a product image stream of a first product comprising a plurality of product image frames;

receiving, by a computer device operably connected to the one or more cameras, the plurality of product image frames, the computer device comprising a processor, a data storage device, and image processing instructions executable on the processor, wherein the image processing instructions are configured for:

generating at least one gray scale vector for an input product image for the first product based on product image frames of the first product, wherein each of the at least one gray scale vectors include integer values representing a number of pixels having an associated gray scale value in the captured product image of the first product;

storing at least one gray scale vector cluster, on the data storage device, for a non-defective product, wherein each of the at least one gray scale vector cluster comprises an anomaly index;

detecting, via defect detector instructions executable on the processor, product defects in the first product, and instructions further configured for matching at least one gray scale vector for the first product to the at least one gray scale vector clusters for a non-defective product, wherein the defect detector instructions further comprise instructions configured for assigning an anomaly value to the at least one gray scale vector based on the matching of the at least one gray scale vector for the first product to the at least one gray scale vector cluster for the non-defective product;

comparing the anomaly value for the first product image to a threshold anomaly value; and providing an inspection output indicating whether the first product is defective based on the comparing of the anomaly value to the threshold anomaly value.

13. The method of claim 12 wherein the step of generating the gray scale data vector comprises:

generating a plurality of gray scale vectors for a plurality of image frames of an input product image stream or video;

matching the plurality of gray scale data vectors for the plurality of image frames to one or more gray scale vector clusters to provide the anomaly value for each of the plurality of image frames; and rejecting the product associated with the image frames based upon the anomaly value relative to the threshold anomaly value.

14. The method of claim 13 and comprising the step of:

rotating the product in front of a camera to capture the plurality of image frames where the plurality of image frames corresponds to a circumference of the product.

15. The method of claim 13 and comprising the step of:

separating the plurality of product image frames into product image files corresponding to a plurality of product movable along a conveyor path.

16. A non-transitory storage device storing an inspection application to detect product defects comprising instructions, the inspection application being implemented through one or more hardware devices or circuitry and adapted to:

one or more cameras to capture a product image stream of a first input product comprising a plurality of product image frames;

a computer device operably connected to the one or more cameras to receive the plurality of product image frames, the computer device comprising a processor, a data storage device, and image processing instructions executable on the processor, wherein the image processing instructions are configured to generate at least one gray scale vector for a first input product image based on the received product image frames of the first input product image, wherein each of the at least one gray scale vector includes integer values representing a number of pixels having an associated gray scale value in the first input product image;

at least one gray scale vector cluster for a non-defective product, wherein the at least one gray scale vector cluster is stored on the data storage device, wherein each of the at least one gray scale vector cluster comprises an anomaly index; and defect detector instructions executable on the processor and configured to detect product defects in the first input product image and wherein the defect detector instructions to detect product defects further comprises instructions configured to match the at least one gray scale vector for the first input product to the at least one gray scale vector clusters for a non-defective product, wherein the defect detector instructions further comprise instructions configured to assign an anomaly value to the at least one gray scale vector based on the matching of the at least one gray scale vector for the first input product image to the at least one gray scale vector cluster for the non-defective product, and wherein the defect detector instructions further comprise instructions configured to provide an inspection output indicating whether the first input product image is defective based on comparing the anomaly value to a threshold value.

17. The non-transitory storage device of claim 16 wherein the gray scale vector clusters are generated using a training set of product images for defective or non-defective product.

18. The non-transitory storage device of claim 16 wherein the input product image includes an input image stream or video including a plurality of product image frames for a product and the application generates gray scale data vectors for the plurality of product image frames and matches each of the gray scale data vectors to vector clusters to provide the anomaly value for the gray scale data vectors for the plurality of product image frames.

19. The non-transitory storage device of claim 18 wherein the input image stream includes the plurality of product image frames for product movable along a conveyor assembly and the application includes product tracking features to separate image frames for sequential product to compile a product image file for the sequential product movable along the conveyor assembly.

20. The non-transitory storage device of claim 18 wherein the plurality of product image frames are divided into a plurality of cells and the application generates a plurality of gray scale data vectors for each of the plurality of cells and matches each of the plurality of gray scale data vectors to the one or more vector clusters to provide the anomaly value.

* * * * *